United States Patent [19]

Hunt

[11] 4,231,068
[45] Oct. 28, 1980

[54] OPTICAL SCREENS

[75] Inventor: Geoffrey H. Hunt, Farnham, England

[73] Assignee: The Secretary of State for Defence in Her Britannic Majesty's Government of the United Kingdom of Great Britain and Northern Ireland, London, England

[21] Appl. No.: 914,771

[22] Filed: Jun. 12, 1978

[30] Foreign Application Priority Data

Jun. 15, 1977 [GB] United Kingdom ............... 25090/77

[51] Int. Cl.² ............................................. H04N 5/72
[52] U.S. Cl. ....................... 358/252; 358/232; 313/463
[58] Field of Search ............... 358/230, 232, 252, 253; 350/160 LC, 156, 157, 268, 276 R; 313/461, 463

[56] References Cited

U.S. PATENT DOCUMENTS

| 2,819,459 | 1/1958 | Dodd | 358/252 |
| 3,015,693 | 1/1962 | Volberg | 358/232 |
| 3,185,020 | 5/1965 | Thelen | 358/252 |

FOREIGN PATENT DOCUMENTS 1955977 8/1970 Fed. Rep. of Germany.
2261738 1/1972 United Kingdom.

Primary Examiner—John H. Wolff
Assistant Examiner—Joseph A. Popek
Attorney, Agent, or Firm—Stevens, Davis, Miller & Mosher

[57] ABSTRACT

A cathode ray tube has an optical screen formed of a series of strips aligned with the writing direction of the cathode ray tube raster. The strips each comprise a layer of electro-optical material, and are electrically interconnected with the cathode ray tube circuitry so that each strip is transparent when the raster is writing on a cathode ray tube display face behind it. The electro-optical material is preferably a liquid crystal material.

13 Claims, 12 Drawing Figures

OPTICAL SCREENS

BACKGROUND OF THE INVENTION

The present invention relates to optical screens for use in particular with cathode ray tubes of the type in which an electron beam, known as a raster, is rapidly moved over a large number of parallel lines on a display face.

In the above mentioned type of cathode ray tube the display face is coated by a substance known as a phosphor which is excited to emit light by the electron beam. The speed of scanning of the raster and the decay time of the phosphor are chosen to be such that the human eye sees a substantially steady raster display without flickering. The best known use of this type of cathode ray tube is in a television set. However, this type of tube is being increasingly used in aircraft, not only for radar displays but also for displays of aircraft flight and other parameters which are displayed to a pilot.

A problem with cathode ray tubes is that phosphors, by their nature, strongly scatter illumination from external sources, to such an extent that the raster display can become unreadable in high ambient illumination. Anti-reflection coatings are not effective in reducing this scattered light, and in the limited environment of an aircraft cockpit it is difficult or impossible to shield a display face from high ambient illumination during all flight conditions.

The present invention provides an optical screen which enhances the contrast of the image.

SUMMARY OF THE INVENTION

According to the present invention an optical screen has a series of parallel strips, each strip including an electro-optical substance such that the strip can be made absorbent or transparent as required by varying voltage applied to the strip.

The voltage variation may be voltage level, frequency or both.

In conjunction with a cathode ray tube the screen is positioned so that the strips are aligned with the writing direction of the cathode ray tube raster, and the strips are electrically interconnected with the cathode ray tube circuitry so that each strip is transparent when the raster is writing on the cathode ray tube display face behind it. To avoid flicker caused by parallax effects when the screen is viewed from an angle each strip can be switched to transparent slightly before the raster moves to write behind it. Once the raster has moved from behind a strip and light emission has decayed, the strip is switched to be absorbent and non-reflecting.

The strips may be formed of PLZT material, but are preferably liquid crystal cells, formed of a layer of liquid crystal sandwiched between two plates of a transparent electrically conducting material such as, for example, tin oxide. The liquid crystal material may be mixed with a pleochroic dye and used in the guest-host interaction mode known in the art.

The optical effects of liquid crystal cells are usually most pronounced with polarised light, so optical screens according to the invention will usually include one or more sheets of polaroid material.

According to one embodiment of the invention an optical screen includes a first polaroid sheet, a substantially 90° twisted nematic liquid crystal cell, and a second polaroid sheet. In one form of this embodiment the polaroid sheets have their axes mutually parallel and aligned parallel or perpendicular to the direction of alignment of the liquid crystal molecules at the boundary surfaces, so that in the twisted state of the cell light polarised by the first polaroid sheet has its electric field vector rotated substantially 90° by the cell and cannot pass the second polaroid sheet, making the screen opaque. Application of a drive voltage to the cell re-aligns the liquid crystal molecules, which have positive electric anisotropy allowing light to pass directly through the cell making the screen transparent. In another form of this embodiment the axis of the first and second polaroid sheets are substantially at right angles, with the result that the effects of applying a drive voltage to the cell on operation of the screen are reversed. The liquid crystal may be of the pure nematic type or may be nematic with a small amount of cholesteric liquid crystal added, as known in the art.

In another embodiment of the invention an optical screen includes a polaroid sheet and a twisted nematic liquid cell in which a pleochroic dye is mixed with the liquid crystal material. With such a cell, depending on the drive voltage supplied, the cell is either absorbent or transparent to polarised light in certain wavelength ranges.

Yet further embodiments of the invention utilise liquid crystal materials which exhibit the Freedericksz effect. These materials can be used either with or without a pleochroic dye, as will be described below.

The screen is preferably transparent when there is no drive voltage supplied, making it "fail-safe" in the sense that a cathode ray tube display will still remain visible in the event of a breakdown of power supplies to the screen. Alternatively, the screen can be so constructed that in the event of such a breakdown it can be physically removed from in front of the cathode ray tube.

The screen preferably includes an anti-reflection coating.

Some embodiments of the invention will now be described, by way of example only, with reference to the accompanying diagrammatic drawings, of which

DESCRIPTION OF THE PREFERRED EMBODIMENT

Figure 1:
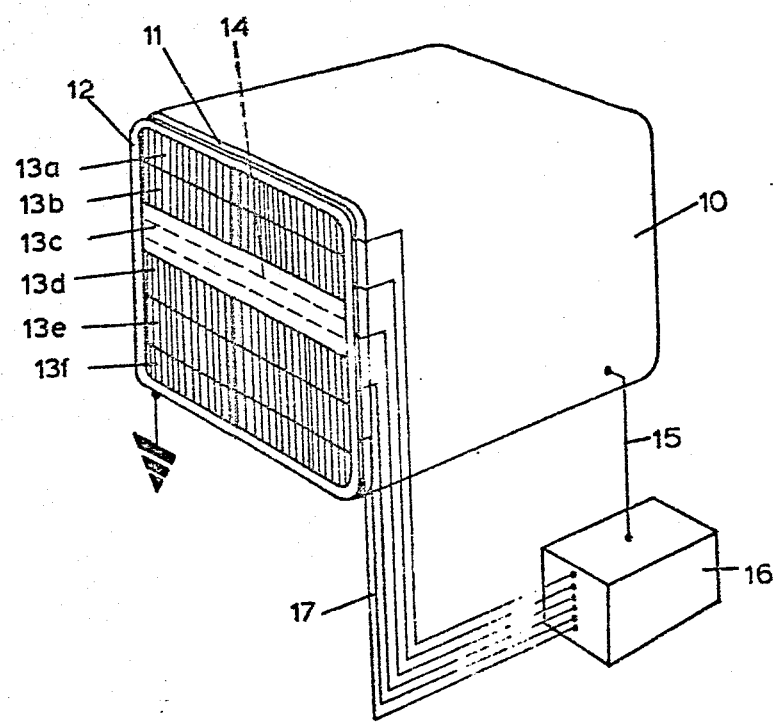
FIG. 1 is a perspective view of a cathode ray tube having an optical screen according to the invention

A cathode ray tube 10 (FIG. 1) having a display face 11 has immediately forward of the face 11 an optical screen 12. The screen 12 includes a number of strips 13A to 13F aligned parallel to the direction of writing motion, as illustrated by the dotted lines at 14, of a cathode ray tube raster. Each strip 13 includes an elecro-optical substance, and is electrically insulated from neighbouring strip 13. In operation, a signal 15 from the cathode ray tube 10 to a control box 16 signals the position on the display face 11 of the raster 14. According to the position of the raster 14 electrical signals 17 are fed to the strips 13 in such a way that a strip 13C immediately forward of the raster is transparent, whilst the other strips 13 are absorbent and non-reflecting. To avoid parallax between the strips and the raster the next strip 13D can be switched to become transparent prior to the raster 14 crossing the juncture between strips 13C and 13D. As the raster 14 moves down the screen 12 and the light emission behind strip 13C fades, strip 13C can be switched to absorbent and non-reflecting at a convenient time.

Figure 2:
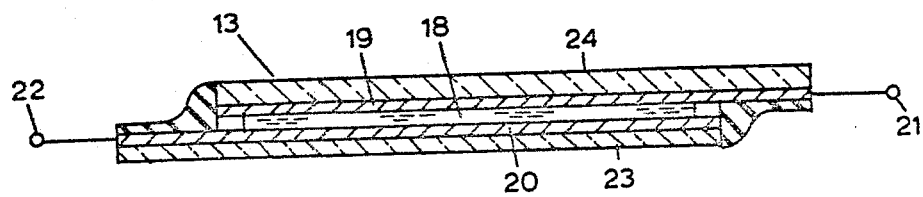
FIG. 2 is a view of a liquid crystal cell.

A typical strip 13 in the form of a liquid crystal cell (FIG. 2) includes a layer 18 of liquid crystal material between electrodes 19,20 of an electrically conducting translucent material such as, for example, tin oxide, indium oxide or a mixture thereof. A drive voltage is applied to the cell via terminals 21, 22 attached respectively to the electrodes 19, 20. Outward of the electrodes 19, 20 are sheets 23, 24 of translucent material such as glass or a polaroid.

Figure 3:
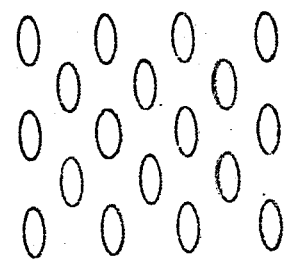
FIG. 3 shows molecule alignment in a nematic liquid crystal.

The alignment of the molecules in a nematic liquid crystal are illustrated in FIG. 3.

Figure 4A:
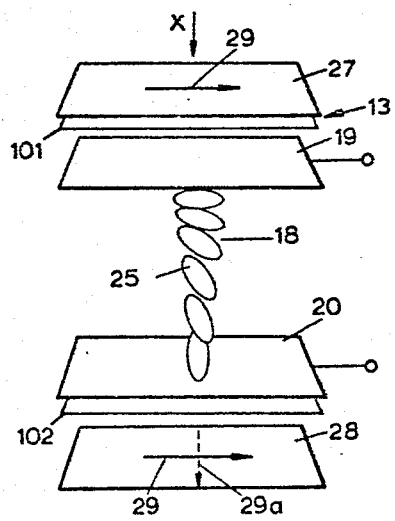
FIGS. 4A and 4B are exploded perspective views of polaroids and a twisted nematic liquid crystal cell as used in one embodiment of the invention.
Figure 4B:
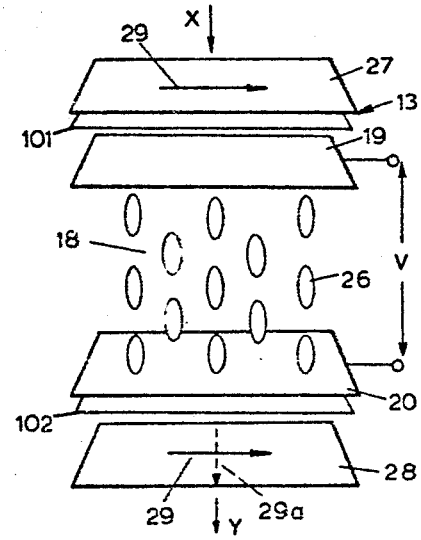

A strip 13 for use in one embodiment of the invention and using a twisted nematic liquid crystal material is illustrated in FIG. 4. In a twisted nematic cell molecules of the crystal are twisted through an angle, usually 90°, through the thickness of the cell, as shown at 25 in FIG. 4A. Under the influence of a direct or alternating voltage the molecules may realign as indicated at 26 in FIG. 4B. Polarised light passing through the cell in the twisted state has its electric field vector rotated through an angle of 90°. A strip 13 as illustrated in FIG. 4 has a first polaroid 27, glass plates 101, 102, transparent electrodes 19, 20, enclosing the twisted nematic liquid crystal material 18 and a second polaroid 28 aligned parallel with the first polaroid 27, as indicated by the arrows 29. Light passing through the first polaroid 27, when the liquid crystal is in the twisted nematic state, is polarised by the polaroid 27, twisted through 90° by the liquid crystal material 18, and cannot pass through the polaroid 28. The strip 13 is thus opaque. When a voltage is applied between the electrodes 19, 20 (FIG. 4B) the liquid crystal molecules realign, the light is no longer rotated on passage through the liquid crystal material 18, and thus passes through the second polaroid 28, as illustrated by the arrow Y, and the strip 13 therefore becomes transparent. In an alternative arrangement, the polaroids 27, 28 are mutually at right angles, as illustrated by the arrows 29A, in which case the strip 13 is translucent with no voltage applied between the electrodes 19, 20 and opaque when a voltage is applied.

In another embodiment of the invention a pleochroic dye (which may be a single substance or a mixture of substances) is mixed with liquid crystal material 18 in a twisted nematic form. The molecules of the dye align themselves according to the liquid crystal molecule alignment, and have the property of absorbing polarised light in one alignment, and of being non-absorbent in another alignment.

Figure 5:
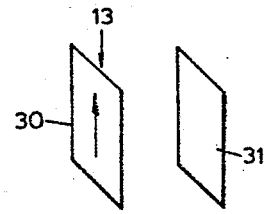
FIG. 5 is a view of a polaroid and a twisted nematic liquid crystal cell including pleochroic dye as used in another embodiment of the invention.

A strip 13 according to this embodiment is illustrated schematically in FIG. 5, and has a single polaroid 30 and a twisted nematic liquid crystal cell 31, the liquid crystal material containing pleochroic dye. In use light is polarised by the polaroid 30, and is absorbed by the dye in one alignment making the strip 13 light absorbent and non-reflecting, and transmitted by the cell 31 in the other dye molecule alignment, making the strip 31 transparent. These effects are reversed by the application or removal of a potential difference between the electrodes of the cell 31, depending on the relative alignments of the polaroid 30 and cell 31.

Whilst the operation of the above embodiments have been described as being operated by varying the voltage level, it is known in the art that for many liquid crystal materials a much quicker response is obtained using what is known as two-frequency switching. In this an alternating voltage is applied continuously to the liquid crystal cell. Realignment of the liquid crystal cells is effected by switching from low frequency to very high frequency, or vice versa.

Further embodiments of the invention use nematic liquid crystals which are arranged to exhibit what are known in the art as the positive and negative Freedericksz effects.

Figure 6A:
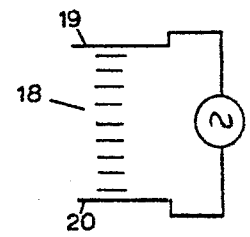
FIGS. 6A and 6B, 7A and 7B are elevations in section of nematic liquid crystals exhibiting the Freedericksz effect, as used in further embodiments of the invention
Figure 6B:
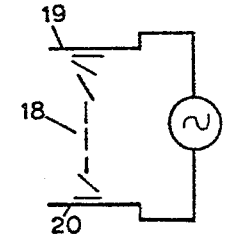

For the positive Freedericksz effect a thin (typically 6 to 25 μm thick) film of a nematic liquid crystal material having a positive dielectric anisotropy is contained between conductively coated glass plates, the electrode surfaces being treated to give a parallel homogenous texture in the unenergised state (FIG. 6a). When the liquid crystal cell is sandwiched between crossed or parallel linear polarisers in such a way that the optic axis of the cell is at $\pm \pi/4$ to the transmission axis of one of the polarisers the combination appears to be transparent and colourless. When a voltage is applied across the cell the liquid crystal molecules realign, the degree of realignment being dependent on the applied voltage. As the voltage is increased the arrangement progressively absorbs wavelengths of the colour spectrum until eventually (FIG. 6b) it becomes totally absorbent.

Figure 7A:
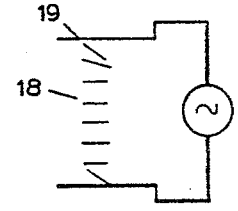
Figure 7B:
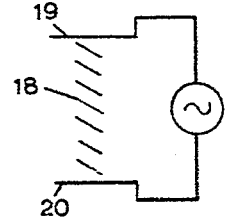

In the negative Freedericksz effect a nematic liquid crystal having negative dielectric anisotropy is contained as for the positive effect, but with the cell walls treated to give homeotropic alignment (FIG. 7a). Application of an alternating voltage across the cell reorientates the liquid crystal molecules (FIG. 7b) to give a similar spectral effect to that described above.

Figure 8A:
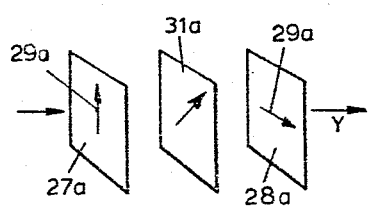
FIGS. 8A and 8B illustrate the use of polaroids and nematic liquid crystal cell exhibiting the Freedericksz effect, as used in embodiments of the invention.
Figure 8B:
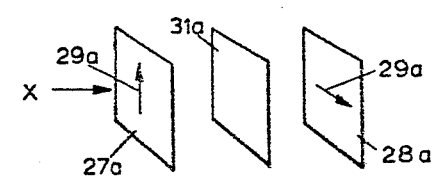

Many cathode ray displays are monochrome, so the spectral qualities of the Freedericksz effect can be used to advantage. Liquid crystal cells 31a having crossed polarisers 27a, 28a are illustrated in the transparent state in FIG. 8a and in the absorbent state in FIG. 8b. Switching of the cells may be made quicker and more effective by the use of birefringent sheets (illustrated in dotted lines at 150 in FIGS. 8a and 8b) positioned between the cell 31a and one of the polarisers 27a, 28a.

The Freedericksz effect can also be used with pleochroic dye dissolved in the liquid crystal material.

Further embodiments of the invention include two cells of the Freedericksz or of the twisted nematic type, with pleochroic dye dissolved, disposed to be mutually adjacent and with their alignment directions orthogonal. Alternatively a liquid crystal material of the cholesteric to nematic phase change type can be used with a pleochroic dye, the liquid crystal material being cholesteric with positive or variable dielectric anisotropy. The dynamic scattering effect can be used, with a nematic or long-pitched cholesteric liquid crystal material having negative or variable dielectric anisotropy mixed with a pleochroic dye.

The type of cell to be used for the strips 13 in a particular screen 12 will be a matter of convenience. For example, where the screen 12 is constructed integrally with the cathode ray tube 10 it will be advisable for the strip 13 to be of the type which is transparent when there is no voltage applied across it. The number of strips 13 on a particular screen 12 will again be a matter of choice, and will probably be decided by the maximum external illumination from which it is desired to protect the face 11 of the cathode ray tube 10. Significant benefits can be obtained from screens 12 having only 2 strips 13. Preferably more than 2 strips 13 will be used, but there comes a stage where the provision of more strips 13 will suffer from the law of diminishing returns.

Advantageously each screen 12 will include an anti-reflection coating. While strips 13 have been described as being formed of separate liquid crystal cells it will be realised that a single cell may be used, electrodes 19, 20 being etched to separate the cell into a plurality of strips 13.

The descriptions of the various liquid crystal effects have been described very briefly, as they are well known in the art and as there is a considerable amount of literature describing each effect in considerable detail.

The invention may also use PLZT materials.

What I claim is:

1. An optical screen for use with a cathode ray tube having a display face and a raster, comprising a series of parallel strips aligned with the writing direction of said raster, each of said parallel strips comprising a layer of electro-optical substance, and means for sequentially varying a voltage applied across said strips so that each strip is transparent when said raster is writing behind it and becomes light absorbent when said raster is not writing behind it.

2. An optical screen as claimed in claim 1 wherein the level of said voltage is varied.

3. An optical screen as claimed in claim 1 wherein said voltage is alternating and its frequency is varied.

4. An optical screen as claimed in claim 1, 2 or 3 wherein said optical screen also comprises an anti-reflection coating.

5. An optical screen as claimed in claim 1, 2 or 3 wherein said electro-optical substance is a liquid crystal material sandwiched between two plates of transparent electrically conducting material.

6. An optical screen as claimed in claim 5 wherein said liquid crystal material is nematic.

7. An optical screen as claimed in claim 6 wherein said nematic liquid crystal material is arranged in a twisted nematic form.

8. An optical screen as claimed in claim 7 wherein said layer of liquid crystal material is sandwiched between at least two sheets of polaroid material.

9. An optical screen as claimed in claim 7 wherein a pleochroic dye is dissolved in said liquid crystal material and said screen further comprises a sheet of polaroid material.

10. An optical screen as claimed in claim 6 wherein said nematic liquid crystal material is arranged to exhibit a Freedericksz effect.

11. An optical screen as claimed in claim 10 wherein said layer of liquid crystal material is sandwiched between at least two sheets of polaroid material.

12. An optical screen as claimed in claim 10 further comprising one or more sheets of birefringent material located between at least one of said plates and said electro-optical substance.

13. An optical screen as claimed in claim 10 wherein a pleochroic dye is dissolved in said liquid crystal material and said screen further comprises a sheet of polaroid material.

* * * * *